(12) United States Patent
Lun

(10) Patent No.: US 9,353,821 B2
(45) Date of Patent: May 31, 2016

(54) FLUID DAMPER ASSEMBLY WITH GAS CUP LUBRICATION CHAMBER

(71) Applicant: Saiman Lun, Kettering, OH (US)

(72) Inventor: Saiman Lun, Kettering, OH (US)

(73) Assignee: BeijingWest Industries Co., Ltd., Beijing (CN)

( * ) Notice: Subject to any disclaimer, the term of this patent is extended or adjusted under 35 U.S.C. 154(b) by 0 days.

(21) Appl. No.: 14/356,264

(22) PCT Filed: Jul. 17, 2013

(86) PCT No.: PCT/CN2013/079530
§ 371 (c)(1),
(2) Date: May 5, 2014

(87) PCT Pub. No.: WO2014/056339
PCT Pub. Date: Apr. 17, 2014

(65) Prior Publication Data
US 2015/0204407 A1    Jul. 23, 2015

Related U.S. Application Data

(60) Provisional application No. 61/710,833, filed on Oct. 8, 2012.

(51) Int. Cl.
*F16F 9/32* (2006.01)
*F16F 9/53* (2006.01)
(Continued)

(52) U.S. Cl.
CPC ............... *F16F 9/3278* (2013.01); *F16F 9/067* (2013.01); *F16F 9/369* (2013.01); *F16F 9/535* (2013.01)

(58) Field of Classification Search
CPC ......... F16F 9/369; F16F 9/535; F16F 9/3278; F16N 9/04; F16N 11/10
USPC ......... 188/267.1, 267.2, 297, 322.22; 184/18, 184/54, 100
See application file for complete search history.

(56) References Cited

U.S. PATENT DOCUMENTS 4,076,103 A * 2/1978 Wallis ............................ 184/25
5,339,932 A * 8/1994 Lanterman .................... 188/316
(Continued)

FOREIGN PATENT DOCUMENTS

CN    102182782 A    9/2011
CN    102588497 A    7/2012
(Continued)

OTHER PUBLICATIONS

EPO translation, FR 2672355 (Aug. 1992), translation dated Jul. 2015.*
(Continued)

*Primary Examiner* — Thomas J Williams
(74) *Attorney, Agent, or Firm* — Dickinson Wright PLLC

(57) ABSTRACT

A gas cup (36) is slidably disposed in the main chamber (34) of a housing (20) and a piston (50) is disposed spaced apart from the gas cup (36). The gas cup (36) includes a volume reducing device (110) for forcing a lubricant from a closed lubricant chamber (112) through a lubricant passage (108) to a lubricant reservoir (106) in response to a sliding movement of the piston (50). A flexible diaphragm (116) flexes into the closed lubricant chamber (112) in response to the sliding movement of the piston (50). A seal cap (118) sandwiches the flexible diaphragm (116) between the seal cap (118) and an annular projection (114) and the seal cap (118) includes a plurality of seal ports (120) for forcing the lubricant to flow from the closed lubricant chamber (112) through the lubricant passage (108) to the lubricant reservoir (106). The seal cap (118) includes a skirt (122) retained on the annular projection (114). A fluid seal (104) is disposed about the skirt (122) and spaced apart from the gas cup (36) to define the lubricant reservoir (106).

7 Claims, 2 Drawing Sheets

(51) Int. Cl.
*F16F 9/36* (2006.01)
*F16F 9/06* (2006.01)

(56) References Cited

U.S. PATENT DOCUMENTS

| | | | |
|---|---|---|---|
| 6,182,806 B1 * | 2/2001 | Hasegawa | 188/297 |
| 2005/0013020 A1 | 1/2005 | Watling et al. | |
| 2013/0220749 A1 * | 8/2013 | Stammen | 188/269 |

FOREIGN PATENT DOCUMENTS

| | | | |
|---|---|---|---|
| DE | 2051595 | A1 | 5/1971 |
| EP | 0637701 | A1 | 2/1995 |
| EP | 0902211 | A2 | 3/1999 |
| FR | 2672355 | A1 * | 8/1992 |
| GB | 317263 | A * | 11/1928 |
| JP | 51110175 | A | 9/1976 |
| JP | 5882546 | U | 6/1983 |
| JP | H08152037 | A | 11/1994 |
| JP | H08152037 | A | 6/1996 |
| JP | 2011122668 | A | 6/2011 |

OTHER PUBLICATIONS

International Search Report, Sep. 5, 2013, 3 pages.
Supplementary European Search Report; Dated Feb. 25, 2016; 7 Pages.

* cited by examiner

FLUID DAMPER ASSEMBLY WITH GAS CUP LUBRICATION CHAMBER

BACKGROUND OF THE INVENTION

1. Field of the Invention

The present invention relates generally to a fluid damper assembly for use in a vehicle.

2. Description of the Prior Art

Such a fluid damper assembly is disclosed in the U.S. Patent Application 2008/0314706 to Lun which includes a housing defining a main chamber extending along a center axis between a closed end and a rod end. A gas cup is disposed in the main chamber and is slidable along the center axis. The gas cup divides the main chamber of the housing into a gas chamber extending between the closed end and the gas cup and a fluid chamber extending between the gas cup and the rod end. A piston is disposed in the fluid chamber and is axially slidable along the center axis. A piston rod is connected to the piston and extends through the rod end to the exterior of the piston. A fluid seal is disposed annularly about the gas cup and is in sealing engagement with the housing. The gas cup and the fluid seal define a lubricant reservoir. The gas cup defines a lubricant passage for delivering a lubricant through the lubricant reservoir to lubricate the fluid seal.

It has long been recognized that the gas cup is slidably disposed in the housing of the fluid damper assembly to adjust for the volume change caused by the piston, thermal expansion of a damping fluid, and normal loss of the damping fluid. In addition, it is also known in the prior art that the gas cup of the fluid damper assembly includes fluid seals to provide separation between a high pressured gas contained in the gas chamber and damping fluid, e.g., hydraulic fluid, magnetorheological (MR) fluid, contained in the fluid chamber. However, the damping fluid, e.g., MR fluid, contains abrasive particles which causes premature wear to the fluid seals of the gas cup that ultimately lead to a premature failure of the fluid damper assembly.

Therefore it is desirable to reduce the premature wear of the fluid seals of the gas cup to thereby improve and extend the performance of the gas cup in the fluid damper assembly.

SUMMARY OF THE INVENTION

The invention provides for such fluid damper assembly for use in a vehicle including a volume reducing device supported by the gas cup for forcing the lubricant to the lubricant passage in response to an axial sliding movement of the piston.

The present invention allows for lubricants to concentrically lubricate the seals of the gas cup to reduce wear on the gas cup and extend the performance life of the gas cup.

BRIEF DESCRIPTION OF DRAWINGS

Other advantages of the present invention will be readily appreciated, as the same becomes better understood by reference to the following detailed description when considered in connection with the accompanying drawings wherein.

DETAILED DESCRIPTION OF ENABLING EMBODIMENTS

Figure 1:
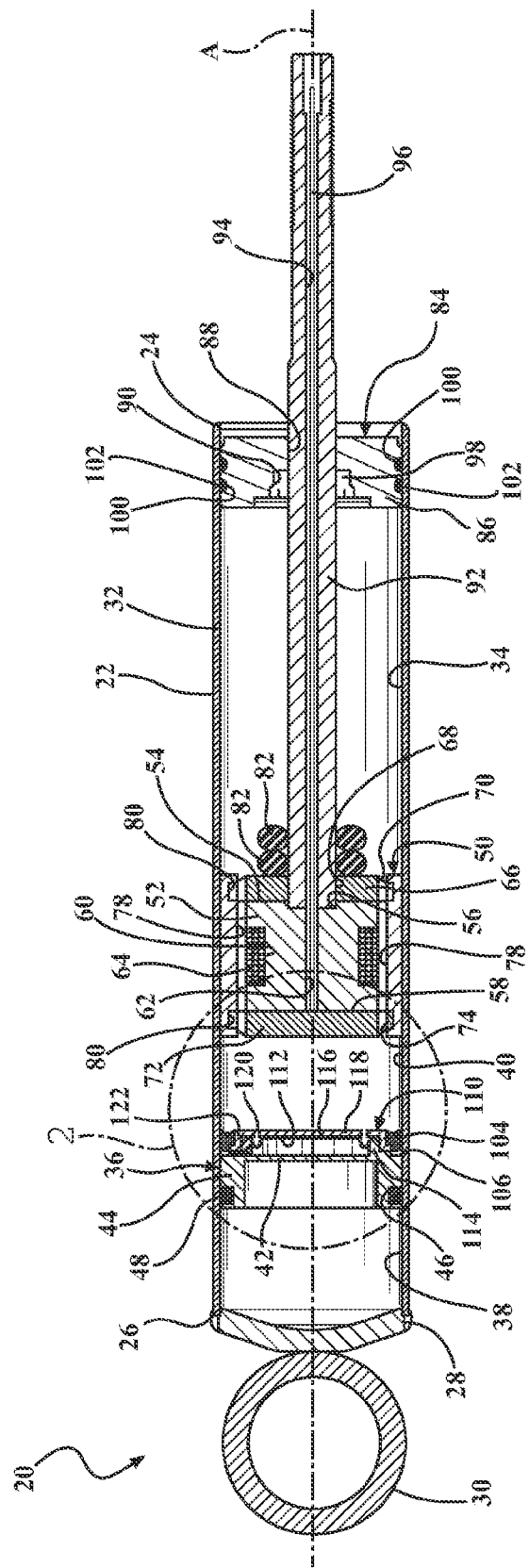
FIG. 1 is a cross-sectional view of the fluid damper assembly.
Figure 2:
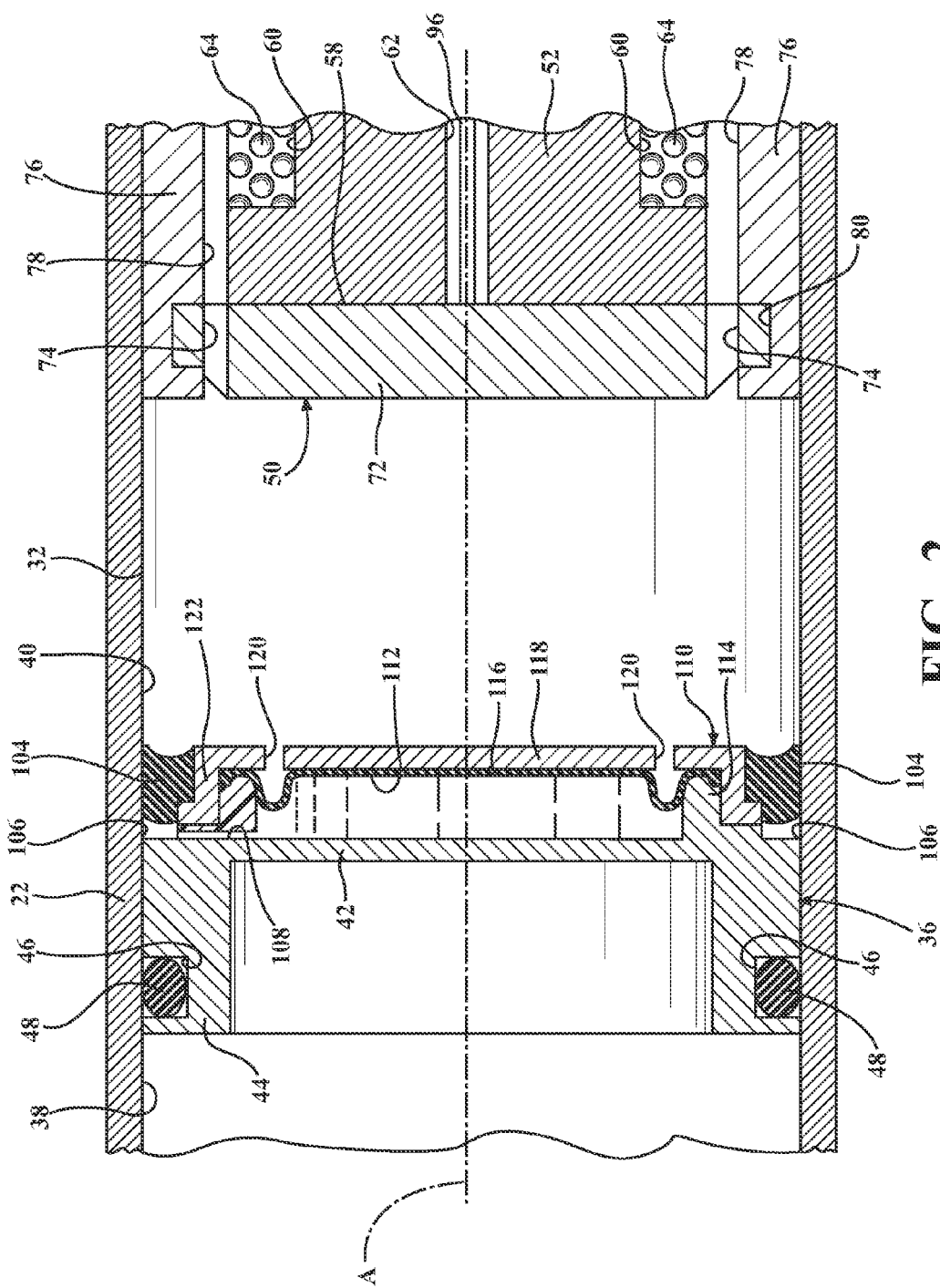
FIG. 2 is an enlarged fragmentary cross-sectional view of the gas cup of the fluid damper assembly taken with the circle labeled 2 in FIG. 1.

Referring to the Figures, wherein like numerals indicate corresponding parts throughout the several views, a fluid damper assembly for use in a vehicle constructed in accordance with the subject invention is shown in FIGS. 1 and 2.

The assembly includes a housing 20, as generally shown, having a tubular shape presenting a housing wall 22 disposed along a center axis A and extending between a rod end 24 and a closed end 26. An end cap 28 is disposed over the housing wall 22 at the closed end 26. The end cap 28 includes a mounting ring 30 disposed on the closed end 26 for attaching the housing 20 to the vehicle. The housing wall 22 defines an inner wall 32 extending about the center axis A enclosing a main chamber 34 extending between the rod end 24 and the closed end 26 and the inner wall 32.

A gas cup 36, as generally indicated, is disposed in the main chamber 34 adjacent to the end cap 28 of the housing 20 and is slidable along the center axis A. The gas cup 36 divides the main chamber 34 of the housing 20 into a gas chamber 38 extending between the closed end 26 and the gas cup 36 for containing a high pressured gas and a fluid chamber 40 extending between the gas cup 36 and the rod end 24 of the housing 20 for containing a magnetorheological fluid having a predetermined viscosity. In other words, the main chamber 34 is separated into the gas chamber 38 and the fluid chamber 40 by the gas cup 36 wherein the gas chamber 38 contains the high pressure gas and extends between the closed end 26 and the gas cup 36 and the fluid chamber 40 contains the magnetorheological fluid and extends between the gas cup 36 and the rod end 24. The gas cup 36 includes a top portion 42 and a body portion 44 extending annularly from the top portion 42 about the center axis A. The body portion 44 of the gas cup 36 defines a seal groove 46 disposed on the body portion 44 extending annularly about the center axis A. A gas seal 48 is disposed in the seal groove 46 and extends annularly about the body portion 44 and abuts the inner wall 32 of the housing 20 for sealing the gas chamber 38. The gas seal 48 is of an impermeable material that prevents any magnetorheological fluid from flowing into the gas chamber 38. Alternatively, instead of containing a magnetorheological fluid, the fluid chamber 40 may contain a hydraulic fluid.

A piston 50, as generally indicated, is disposed concentrically to the center axis A and is spaced from the gas cup 36 in the fluid chamber 40 of the housing 20 and is slidable along the center axis A. The piston 50 includes a core unit 52 having a cylindrical shape presenting a core top 54 defining an annular recess 56 extending along the center axis A and a core bottom 58. A core groove 60 is disposed on the core unit 52 between the core top 54 and the core bottom 58 of the core unit 52 extending annularly about the center axis A. The core unit 52 defines a core unit channel 62 disposed on the center axis A extending through the core unit 52 of the piston 50 between the core top 54 of the core unit 52 and the core bottom 58 of the core unit 52. A plurality of coils 64 is disposed in the core groove 60 of the core unit 52 and extends annularly about the core unit 52 and the center axis A for providing a magnetic field to change the predetermined viscosity of the magnetorheological fluid.

An upper plate 66 having a circular shape is disposed concentrically to the core unit 52 and abutting the core top 54 of the core unit 52. The upper plate 66 defines an upper plate mounting aperture 68 disposed on the center axis A extending through the upper plate 66. A plurality of upper plate apertures 70 is disposed about the upper plate mounting aperture 68 and extends through the upper plate 66. A lower plate 72 having a circular shape is disposed concentrically to the core unit 52 and abuts the core bottom 58 of the core unit 52. The lower plate 72 defines a plurality of lower plate apertures 74 disposed about the center axis A and extending through the lower plate 72.

A flux ring 76 having a cylindrical shape is disposed annularly about and is spaced apart from the core unit 52 defining a fluid channel 78 extending annularly about the center axis A between the flux ring 76 and the core unit 52 interconnecting the upper plate apertures 70 with the lower plate apertures 74 for allowing the magnetorheological fluids to flow through the piston 50. The flux ring 76 defines a plurality of flux ring recesses 80 and is disposed concentrically and spaced apart from one another in the flux ring 76. The flux ring recesses 80 extend annularly about the center axis A for receiving the upper plate 66 of the piston 50 and the lower plate 72 of the piston 50 to enclose the core unit 52 in the flux ring 76. A plurality of rebound bumpers 82 is disposed concentrically to the upper plate mounting aperture 68 and abuts the upper plate 66 of the piston 50 and extends annularly about the center axis A. Alternatively, the piston 50 may comprise a core unit 52 having a core top 54 and a core bottom 58 defining at least one fluid channel 78 extending from the core top 54 to the core bottom 58 of the core unit 52.

A rod guide 84, as generally indicated, including a body member 86 having a cylindrical shape is disposed concentrically and is spaced apart from the piston 50 on the center axis A in the fluid chamber 40 of the housing 20 adjacent to the rod end 24 of the housing 20 and abuts the inner wall 32 of the housing 20. The body member 86 of the rod guide 84 defines a central bore 88 and an annular cavity 90 interconnected with the central bore 88 disposed on the center axis A and extends through the body member 86 of the rod guide 84.

A piston rod 92 is disposed along the center axis A connected to the core unit 52 of the piston 50 at the annular recess 56 of the core unit 52. The piston rod 92 extends through the upper plate 66 and the central bore 88 of the body member 86 and the rebound bumpers 82 to interconnect the core unit 52 with the upper plate 66 of the piston 50 and the rebound bumpers 82 and the body member 86 of the rod guide 84. In other words, the piston rod 92 extends through the body member 86 of the rod guide 84 connects with the core unit 52 for allowing the piston 50 to slide along the center axis A between the gas cup 36 and the body member 86 of the rod guide 84. The piston rod 92 defines a piston rod channel 94 disposed on the center axis A extending through the piston rod 92 and in communication with the core unit channel 62. A plurality of wires 96 are disposed in the core unit channel 62 and the piston rod channel 94 extending from the core bottom 58 of the core unit 52 through the piston rod channel 94 and along the center axis A for providing power to the coils 64. The wires 96 are electrically connected to the coils 64 providing power to the coils 64 for allowing the coils 64 to produce a magnetic field to change the predetermined viscosity of the magnetorheological fluid.

A body member seal 98 is disposed in the annular cavity 90 of the body member 86 and extends annularly about the piston rod 92 about the body member 86 and the piston rod 92. The body member 86 of the rod guide 84 defines a plurality of body member grooves 100 disposed on the body member 86 of the rod guide 84 and extends annularly about the body member 86 and the center axis A. A rod guide seal 102 is disposed in each of the body member grooves 100 and extends annularly about the body member 86 of the rod guide 84 abutting the inner wall 32 of the housing wall 22 for sealing the fluid chamber 40. The body member seal 98 is of an impermeable material that prevents any magnetorheological fluid from leaking out of the fluid chamber 40 through the rod end 24. A fluid seal 104 is disposed annularly and spaced part from the gas cup 36 and is in sealing engagement with the inner wall 32 of the housing 20 to define a lubricant reservoir 106 extending annularly between the fluid seal 104 and the gas cup 36. The gas cup 36 defines a plurality of lubricant passages 108 extending radially from the center axis A to the lubricant reservoir 106 for delivering a lubricant through the lubricant passage 108 to lubricate the fluid seal 104 and the gas seal 48.

The gas cup 36 includes a volume reducing device 110, as generally indicated, for forcing the lubricant to the lubricant passage 108 in response to an axial sliding movement of the piston 50. The volume reducing device 110 is supported by the gas cup 36 defining a closed lubricant chamber 112 disposed in fluid communication with the lubricant passage 108 for containing the lubricant. The volume reducing device 110 includes an annular projection 114 extending annularly about the center axis A and axially from the gas cup 36 to surround the closed lubricant chamber 112. In other words, in response to the axial sliding movement of the piston 50, the volume reducing device 110 forces the lubricant from the closed lubricant chamber 112 to the lubricant reservoir 106 through the lubricant passage 108.

The volume reducing device 110, includes a flexible diaphragm 116 extending radially outwardly from the center axis A and disposed over the annular projection 114 to close the closed lubricant chamber 112 and separate the closed lubricant chamber 112 from the fluid chamber 40 for flexing into the closed lubricant chamber 112 in response to the axial sliding movement of the piston 50 to force the lubricant to the lubricant passage 108. A seal cap 118 is also included in the volume reducing device 110 and extends radially outwardly from the center axis A and is disposed over the flexible diaphragm 116 to sandwich the flexible diaphragm 116 between the seal cap 118 and the annular projection 114.

The seal cap 118 defines a plurality of seal ports 120 disposed in fluid communication between the fluid chamber 40 and the flexible diaphragm 116 for flexing the diaphragm into the closed lubricant chamber 112 in response to the axial sliding movement of the piston 50 in the fluid chamber 40 for forcing the lubricant to flow from the closed lubricant chamber 112 through the lubricant passage 108 to the lubricant reservoir 106. In other words, as the piston 50 slides axially in the fluid chamber 40, magnetorheological fluids will flow through the seal ports 120 of the seal cap 118 which causes the flexible diaphragm 116 to flex inwardly towards the closed lubricant chamber 112. In response to the flexing of the flexible diaphragm 116, the lubricant in the closed lubricant chamber 112 is forced through the lubrication passage 108 to the lubrication reservoir 106 for lubricating the fluid seal 104 and the gas seal 48. The seal cap 118 includes a skirt 122 extending outwardly and axially from the seal cap 118 and disposed annularly about and retained on the annular projection 114. The fluid seal 104 is disposed annularly about the skirt 122 of the seal cap 118 and is spaced apart from the gas cup 36 between the seal cap 118 and the housing 20 to define the lubricant reservoir 106 extending between the gas cup 36 and the fluid seal 104.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A fluid damper assembly for use in a vehicle comprising;
   a housing defining a main chamber extending along a center axis between a closed end and a rod end,
   gas cup disposed in said main chamber and slidable along said center axis,
   said gas cup dividing said main chamber of said housing into a gas chamber extending between said closed end and said gas cup and a fluid chamber extending between said gas cup and said rod end,
   a piston disposed in said fluid chamber and axially slidable along said center axis,
   a piston rod connected to said piston and extending through said rod end to the exterior of said piston,
   a fluid seal disposed annularly about said gas cup and in sealing engagement with said housing,
   said gas cup and said fluid seal defining a lubricant reservoir,
   said gas cup defining a lubricant passage for delivering a lubricant through said lubricant reservoir to lubricate said fluid seal,
   a volume reducing device including a flexible diaphragm supported by said gas cup and defining a closed lubricrant chamber containing the lubricant and disposed in fluid communication with said lubricant passage for flexing into said closed lubricant chamber and forcing the lubricant to said lubricant passage in response to an axial sliding movement of said piston, and
   said volume reducing device including an annular projection extending annularly about said center axis and axially from said gas cup to surround said closed lubricant chamber.

2. An assembly as set forth in claim 1 wherein said flexible diaphragm extends radially outwardly from said center axis and is disposed over said annular projection to close said closed lubricant chamber and separate said closed lubricant chamber from said fluid chamber.

3. An assembly as set forth in claim 2 wherein said volume reducing device includes a seal cap extending radially outwardly from said center axis and disposed over said flexible diaphragm to sandwich said flexible diaphragm between said seal cap and said annular projection.

4. An assembly as set forth in claim 3 wherein said seal cap defines at least one seal port in fluid communication between said fluid chamber and said flexible diaphragm.

5. An assembly as set forth in claim 4 wherein said seal cap includes a skirt disposed over and annularly about and retained on said annular projection.

6. An assembly as set forth in claim 5 wherein said fluid seal is disposed annularly about said skirt of said seal cap and spaced apart from said gas cup between said seal cap and said housing to define said lubricant reservoir.

7. A fluid damper assembly for use in a vehicle comprising;
   a housing defining a main chamber extending along a center axis between a closed end and a rod end,
   a gas cup disposed in said main chamber and slidable along said center axis, said gas cup dividing said main chamber of said housing into a gas chamber extending between said closed end and said gas cup and a fluid chamber extending between said gas cup and said rod end,
   a piston disposed in said fluid chamber and axially slidable along said center axis, a piston rod connected to said piston and extending through said rod end to the exterior of said piston,
   a fluid seal disposed annularly about said gas cup and in sealing engagement with said housing,
   said gas cup and said fluid seal defining a lubricant reservoir,
   said gas cup defining a lubricant passage for delivering a lubricant through said lubricant reservoir to lubricate said fluid seal,
   a volume reducing device supported by said gas cup and defining a closed lubricant chamber disposed in fluid communication with said lubricant passage for containing the lubricant, and
   said volume reducing device including an annular projection extending annularly about said center axis and axially from said gas cup to surround said closed lubricant chamber,
   wherein said volume reducing device flexes into said closed lubricant chamber and forces the lubricant to said lubricant passage in response to an axial sliding movement of said piston.

* * * * *